(12) United States Patent
McCullough et al.

(10) Patent No.: US 10,116,136 B2
(45) Date of Patent: Oct. 30, 2018

(54) PRIMARY FREQUENCY CONTROL THROUGH SIMULATED DROOP CONTROL WITH ELECTRIC LOADS

(71) Applicant: Battelle Memorial Institute, Columbus, OH (US)

(72) Inventors: Jason McCullough, Columbus, OH (US); Eric Rehberg, Westerville, OH (US); Jason Black, Dublin, OH (US)

(73) Assignee: BATTELLE MEMORIAL INSTITUTE, Columbus, OH (US)

( * ) Notice: Subject to any disclaimer, the term of this patent is extended or adjusted under 35 U.S.C. 154(b) by 236 days.

(21) Appl. No.: 15/074,461

(22) Filed: Mar. 18, 2016

(65) Prior Publication Data

US 2016/0276834 A1 Sep. 22, 2016

Related U.S. Application Data

(60) Provisional application No. 62/135,480, filed on Mar. 19, 2015.

(51) Int. Cl.
*H02J 3/14* (2006.01)
*G05B 15/02* (2006.01)

(52) U.S. Cl.
CPC .............. *H02J 3/14* (2013.01); *Y02B 70/3225* (2013.01); *Y04S 20/222* (2013.01)

(58) Field of Classification Search
CPC ....... H02J 3/14; Y02B 70/3225; Y04S 20/222
See application file for complete search history.

(56) References Cited

U.S. PATENT DOCUMENTS

| | | |
|---|---|---|
| 6,624,532 B1 | 9/2003 | Davidow et al. |
| 6,662,091 B2 | 12/2003 | Wilson et al. |
| 6,941,202 B2 | 9/2005 | Wilson et al. |
| 7,333,880 B2 | 2/2008 | Brewster et al. |
| 7,580,775 B2 | 8/2009 | Kulyk et al. |

(Continued)

OTHER PUBLICATIONS

Alvarez, et al.; "Assessment and simulation of the responsive demand potential in end-user facilities: application to a university customer"; IEEE Transactions on Power Systems; vol. 19; pp. 1223-1231; (2004).

(Continued)

*Primary Examiner* — Charles R Kasenge
(74) *Attorney, Agent, or Firm* — Fay Sharpe LLP (57) ABSTRACT

In a frequency control system, a system controller assigns load-specific threshold frequencies to electrical loads of a fleet of electrical loads. Load controllers perform load monitoring and control operations for controlled electrical loads of the fleet including (i) comparing a measurement of the electrical frequency with the threshold frequency assigned to the controlled electrical load and (ii) operating the controlled electrical load based on the comparison. For example, each load controller may perform operation (ii) by turning the controlled electrical load on if the measurement of the electrical frequency is greater than the threshold frequency assigned to the controlled electrical load, and turning the controlled electrical load off if the measurement of the electrical frequency is less than the threshold frequency assigned to the controlled electrical load. The threshold frequencies may be assigned based on State of Charge (SOC) values for the loads.

17 Claims, 5 Drawing Sheets

(56) References Cited

U.S. PATENT DOCUMENTS

| | | | |
|---|---|---|---|
| 7,653,443 B2 | 1/2010 | Flohr | |
| 7,715,951 B2 | 5/2010 | Forbes, Jr. et al. | |
| 7,839,027 B2 | 11/2010 | Shelton et al. | |
| 7,894,946 B2 | 2/2011 | Kulyk et al. | |
| 7,962,248 B2 | 6/2011 | Flohr | |
| 8,010,812 B2 | 8/2011 | Forbes, Jr. et al. | |
| 8,032,233 B2 | 10/2011 | Forbes, Jr. et al. | |
| 8,121,742 B2 | 2/2012 | Flohr et al. | |
| 8,131,403 B2 | 3/2012 | Forbes, Jr. et al. | |
| 8,178,997 B2 | 5/2012 | Talkin et al. | |
| 8,204,633 B2 | 6/2012 | Harbin, III et al. | |
| 8,220,721 B2 | 7/2012 | Flohr | |
| 8,234,876 B2 | 8/2012 | Parsonnet et al. | |
| 8,249,756 B2 | 8/2012 | Boss et al. | |
| 8,271,143 B2 | 9/2012 | Deivasigamani et al. | |
| 8,306,671 B1 | 11/2012 | Marcus | |
| 8,307,225 B2 | 11/2012 | Forbes, Jr. et al. | |
| 8,311,681 B1 | 11/2012 | Marcus | |
| 8,359,125 B2 | 1/2013 | Park | |
| 8,396,606 B2 | 3/2013 | Forbes, Jr. et al. | |
| 8,396,607 B2 * | 3/2013 | Hirst | H02J 3/14 307/39 |
| 8,401,709 B2 | 3/2013 | Cherian et al. | |
| 8,457,800 B2 | 6/2013 | Marcus | |
| 8,527,108 B2 | 9/2013 | Kulyk et al. | |
| 8,527,109 B2 | 9/2013 | Kulyk et al. | |
| 8,571,692 B2 | 10/2013 | Flohr et al. | |
| 8,671,167 B2 | 3/2014 | Koch | |
| 8,700,187 B2 | 4/2014 | Forbes, Jr. | |
| 8,704,678 B2 | 4/2014 | Wang et al. | |
| 8,831,790 B2 * | 9/2014 | Kimura | H02J 3/32 700/297 |
| 9,343,926 B2 * | 5/2016 | Baba | H02J 7/34 |
| 2008/0167756 A1 | 7/2008 | Golden et al. | |
| 2009/0012916 A1 * | 1/2009 | Barnett | G06Q 50/06 705/412 |
| 2010/0072817 A1 * | 3/2010 | Hirst | H02J 3/14 307/31 |
| 2010/0179705 A1 | 7/2010 | Flohr | |
| 2010/0213763 A1 * | 8/2010 | Boss | H02J 3/14 307/29 |
| 2011/0118891 A1 * | 5/2011 | Hirst | H02J 3/14 700/295 |
| 2011/0190958 A1 * | 8/2011 | Hirst | H02J 3/14 700/295 |
| 2012/0004787 A1 * | 1/2012 | Kimura | H02J 3/32 700/297 |
| 2012/0150359 A1 | 6/2012 | Westergaard | |
| 2012/0191262 A1 | 7/2012 | Marcus | |
| 2012/0217803 A1 | 8/2012 | Talkin et al. | |
| 2012/0245753 A1 | 9/2012 | Forbes, Jr. | |
| 2013/0178991 A1 | 7/2013 | Gheerardyn et al. | |
| 2013/0245853 A1 | 9/2013 | Kulyk et al. | |
| 2013/0268137 A1 | 10/2013 | Kulyk et al. | |
| 2013/0270911 A1 * | 10/2013 | Baba | H02J 7/34 307/65 |
| 2013/0320762 A1 | 12/2013 | Trudel et al. | |
| 2013/0321040 A1 | 12/2013 | Johal et al. | |
| 2014/0037275 A1 | 2/2014 | Flohr | |
| 2014/0052307 A1 | 2/2014 | Flohr et al. | |
| 2014/0052308 A1 | 2/2014 | Hanafusa | |
| 2014/0097683 A1 * | 4/2014 | Piyabongkarn | H02J 3/32 307/26 |
| 2014/0105584 A1 | 4/2014 | Flohr | |
| 2014/0336835 A1 * | 11/2014 | Bloor | H02J 3/14 700/295 |
| 2015/0054454 A1 * | 2/2015 | White, II | H04B 5/0075 320/108 |
| 2015/0112501 A1 * | 4/2015 | Rombouts | G05F 1/66 700/295 |

OTHER PUBLICATIONS

Brooks & Gage; "Integration of Electric Drive Vehicles with the Electric Power Grid—a New Value Stream"; EVS 18; pp. 1-16; Berlin; (2001).

Brooks; "Vehicle-to-Grid Demonstration Project: Grid Regulation Ancillary Service with a Battery Electric Vehicle"; Contract No. 01-313; prepared for the California Air Resources Board and the California Environmental Protection Agency; pp. 1-55; (Dec. 10, 2002).

Brooks & Thesen; "PG&E and Tesla Motors: Vehicle to Grid Demonstration and Evaluation Program"; EVS23; pp. 1-10; (2007).

Cirio, et al.; "Load as Potential Contributor to Security Control and Economy Management in Liberalized Power Systems"; Bulk Power System Dynamics and Control—VI; pp. 295-302; (2004).

Heffner, et al.; "Innovative Approaches to Verifying Demand Response of Water Heater. Load Control"; IEEE Transactions on Power Delivery; pp. 1-11; (2005).

Hirst & Kirby; "Water Heaters to the Rescue"; Public Utilities Fortnightly; pp. 32-39; (Sep. 2003).

Kempton, et al.; "A Test of Vehicle-to-Grid (V2G) for Energy Storage and Frequency Regulation in the PJM System"; pp. 1-32; (Nov. 2008).

Kirby & Staunton; "Technical Potential for Peak Load Management Programs in New Jersey"; Oak Ridge National Laboratory ORNL/TM-2002/271; pp. 1-45; (Oct. 2002).

Kirby; "Spinning Reserve From Responsive Loads"; Oak Ridge National Laboratory ORNL/TM-2003/19; pp. 1-42; (Mar. 2003).

Lockheed Martin Aspen; "Demand Response Enabling Technologies for Small-Medium Businesses"; submitted to Mark S. Martinez; Southern California Edison Company; pp. 1-84; (Apr. 12, 2006).

Molina, et al.; "Approach to Multivariate Predictive Control Applications in Residential HVAC Direct Load Control"; IEEE; pp. 1811-1816; (2000).

* cited by examiner

PRIMARY FREQUENCY CONTROL THROUGH SIMULATED DROOP CONTROL WITH ELECTRIC LOADS

This application claims the benefit of U.S. Provisional Application No. 62/135,480 filed Mar. 19, 2015 and titled "PRIMARY FREQUENCY CONTROL THROUGH SIMULATED DROOP CONTROL WITH ELECTRIC LOADS". U.S. Provisional Application No. 62/135,480 filed Mar. 19, 2015 is incorporated herein by reference in its entirety.

BACKGROUND

The following relates to the electric power arts, energy conservation arts, electric power grid management arts, and related arts.

In electric power grid management, power flow and frequency balancing is performed at various time scales.

Figure 5:
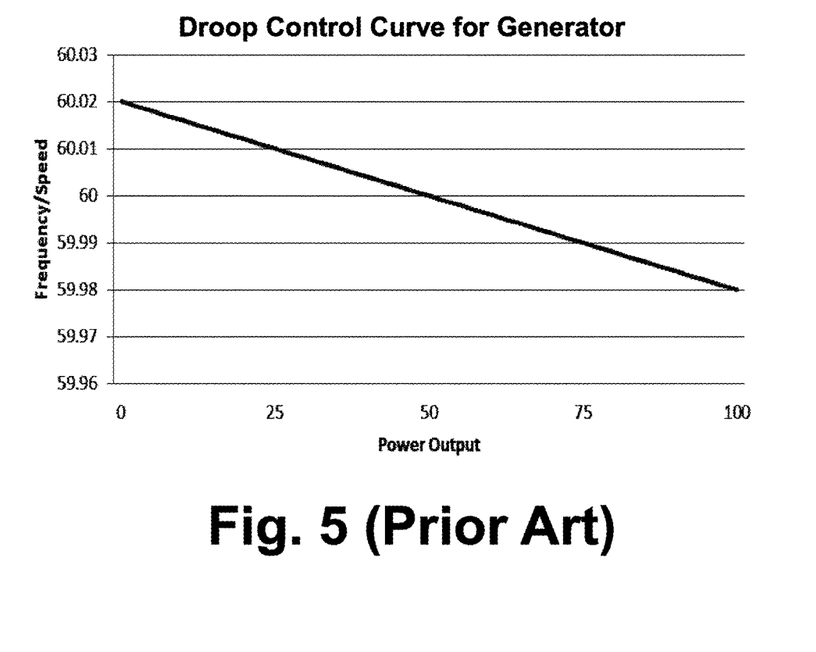
FIG. 5 illustrates a generator droop control curve of the prior art.

Primary frequency control, sometimes called "frequency response", is performed on a time scale of seconds or fractions of a second, and provides a "first response" mechanism to arrest a frequency disturbance due to an unexpected event such as a power generator abruptly going offline. Primary frequency control is a local process in which generators or loads adjust their power based on the locally detected electrical frequency. Generally, if the electrical frequency is above the target frequency then the generator produces less power, while if the frequency is below the target frequency then the generator produces more power. By way of illustration, FIG. 5 shows a typical generator droop control curve for a generator providing primary frequency control. In this example, the generator speed is locked with the electrical frequency (hence the ordinate being labeled "Frequency/Speed"), but as the system frequency moves up or down, the reference speed of the generator is adjusted (via throttling fuel or steam, for example) to move the power output to match. This allows multiple synchronous generators on the system to instantly respond to changes in system frequency and share the load.

Secondary frequency control, sometimes call "frequency regulation", operates on a time scale of a few minutes or less, and provides balance to maintain a desired frequency, e.g. 60 Hz in North America. Secondary frequency control is usually performed by a Supervisory Control and Data Acquisition (SCADA) system in accordance with an Automatic Generation Control (AGC) signal. Secondary frequency control entails substantial communications infrastructure, and has higher latency time as compared with primary frequency control. Moreover, some implementations of secondary frequency control may not be fully automated.

Frequency control on longer time scales is usually referred to as tertiary or time control, and is performed on the basis of a "clock" defined by the time-integrated frequency. If the "clock" is running slow (frequency too low) then the target frequency may be increased slightly (e.g. by a few millihertz) to compensate, while if the "clock" is running fast then the target frequency may be decreased slightly.

BRIEF SUMMARY

In accordance with some illustrative embodiments disclosed herein, a frequency control system is disclosed which provides frequency control for an a.c. electrical power grid operating at an electrical frequency. The frequency control system uses a fleet of electrical loads powered by the electrical power grid. A system controller comprises an electronic data processing device programmed to assign load-specific threshold frequencies to electrical loads of the fleet of electrical loads. Load controllers control the electrical loads of the fleet of electrical loads. Each load controller comprises a microprocessor or microcontroller programmed to perform load monitoring and control operations for a controlled electrical load of the fleet of electrical loads including (i) comparing a measurement of the electrical frequency with the threshold frequency assigned to the controlled electrical load and (ii) operating the controlled electrical load based on the comparison. For example, each load controller may perform operation (ii) by turning the controlled electrical load on if the measurement of the electrical frequency is greater than the threshold frequency assigned to the controlled electrical load, and turning the controlled electrical load off if the measurement of the electrical frequency is less than the threshold frequency assigned to the controlled electrical load. The system controller may be programmed to assign load-specific threshold frequencies to electrical loads of the fleet of electrical loads based on State of Charge (SOC) values for the electrical loads that measure energy stored in the electrical loads.

In accordance with some illustrative embodiments disclosed herein, a frequency control method is disclosed that provides frequency control for an a.c. electrical power grid operating at an electrical frequency using a fleet of electrical loads powered by the electrical power grid. The frequency control method comprises: estimating a State of Charge (SOC) value for each electrical load of the fleet which measures energy stored in the electrical load; assigning load-specific threshold frequencies to electrical loads of the fleet based on the estimated SOC values; and operating electric loads of the fleet whose load specific threshold frequencies are below the electrical frequency while not operating electric loads of the fleet whose load specific threshold frequencies are above the electrical frequency.

In accordance with some illustrative embodiments disclosed herein, a load controller is disclosed for controlling an electrical load. The load controller comprises: a frequency meter configured to measure electrical frequency at the controlled electrical load; and a microprocessor or microcontroller programmed to perform load monitoring and control operations for the controlled electrical load including (i) comparing the electrical frequency at the controlled electrical load measured by the frequency meter with a threshold frequency assigned to the controlled electrical load and (ii) operating the controlled electrical load based on the comparison.

DETAILED DESCRIPTION

Disclosed herein are primary frequency control systems and methods (i.e. frequency response systems and methods) that advantageously leverage a fleet of loads to provide frequency response. The disclosed approaches advantageously provide mechanisms for combining the low latency (on the order of seconds, fractions of a second, or faster) of conventional frequency response operating on a "per-device" basis with the flexibility of secondary frequency control operating on a larger regional scale (e.g. on the scale of a regional balancing authority). The disclosed approaches readily leverage loads with binary "on-off" power draw characteristics. The disclosed approaches can also readily integrate an AGC-type control signal to provide more flexibility in the frequency control as compared with conventional local frequency response.

Figure 1:
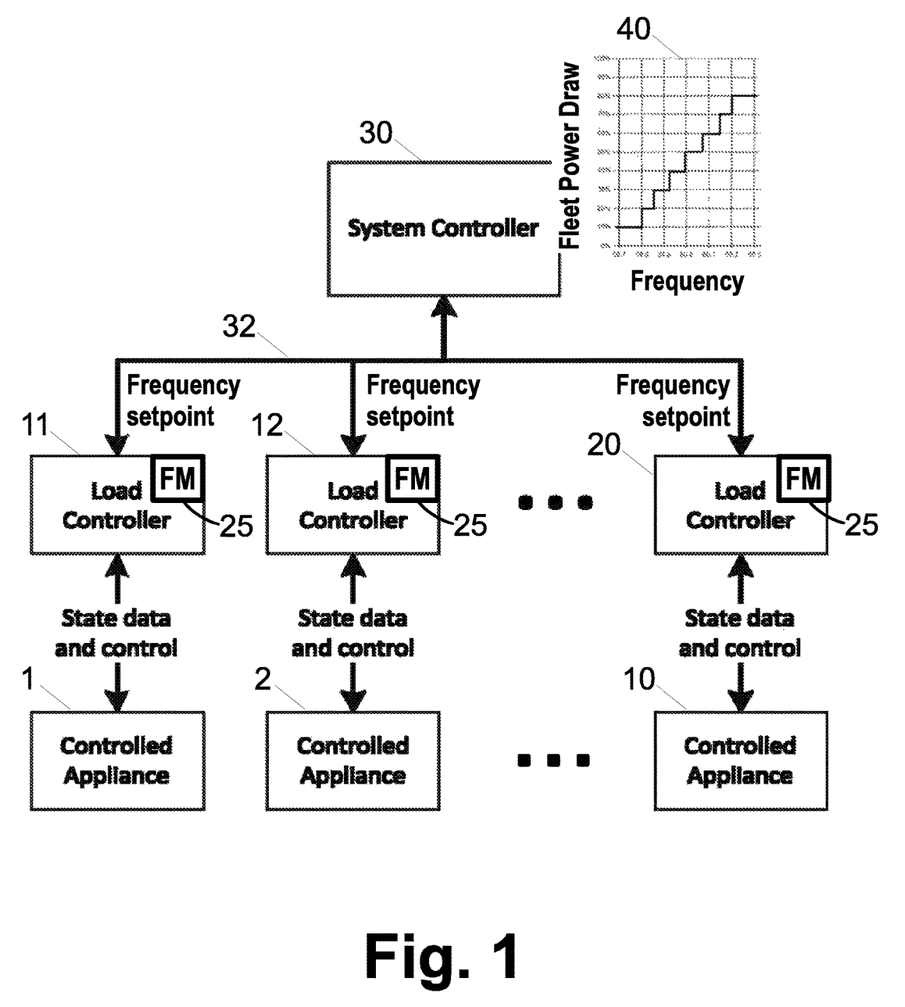
FIG. 1 diagrammatically illustrates a frequency response system employing a fleet of loads (residential appliances, in this example).

With reference to FIG. 1, a fleet of electrical loads 1, 2, ..., 10 are powered by a electrical power grid (not shown) operating at an a.c. frequency denoted herein as f. The a.c. frequency is generally intended to be maintained at a target value, such as 60.000 Hz in typical North American electrical power grids—however, in practice the frequency f undergoes excursions in which the frequency f deviates away from the target frequency. Such excursions can result from changes in the electrical load, and/or from changes in the operative power-generating capacity. Additionally, tertiary or time frequency control may be applied to intentionally adjust the target frequency a few millihertz away from the nominal (e.g. 60.000 Hz) target frequency.

The loads 1, 2, ..., 10 are each individually controlled by a corresponding load controller 11, 12, ..., 20. In the illustrative examples, the fleet of loads includes ten loads, but the fleet may in general include any number of loads. While the illustrative loads 1, 2, ..., 10 are residential appliances, and more particularly (in FIG. 3) residential electric water heaters, the loads of the controlled fleet may in general be any type of load that can store energy, such as electric water heaters, electric room air conditioners, refrigerators, or so forth. In the illustrative example, each load controller 11, 12, ..., 20 operates the load in a binary "on" or "off" fashion. However, more generally, the load controllers could provide more complex control, such as a binary "kW" or "off" control in which "kW" indicates a controllable operating power level, or in a more complex control paradigm the load controller could provide continuously adjustable or multiple discrete power levels.

Each load controller 11, 12, ..., 20 includes a frequency meter 25 that measures the electrical frequency of the a.c. power driving the corresponding load 1, 2, ..., 10. Each frequency meter 25 may, for example, comprise an integrated circuit (IC) with an internal precision timing circuit that counts the time between zero crossings to develop a frequency value. Alternatively, the frequency meters 25 may be moving-coil deflection meters, a resonant reed frequency meters, electrodynamic frequency meters, or so forth. While in illustrative FIG. 1 each load controller 11, 12, ..., 20 has its own frequency meter 25, in other embodiments some or all load controllers may share a frequency meter, if the loads sharing the frequency meter can be reasonably assumed to be powered by a.c. power at the same electrical frequency. Each load controller 11, 12, ..., 20 further comprises a microprocessor or microcontroller programmed to perform load monitoring and control operations. Monitoring operations include monitoring one or more state variables characterizing the controlled load, and more particularly characterizing a "State of Charge" or "SOC" of the load. By way of illustration, in the illustrative case of a load comprising an electric water heater, the SOC may be suitably characterized by a set point temperature of the water heater in combination with the current water temperature as measured by one or more thermocouples or other thermometric devices installed on or in the water tank of the hot water heater. For example, in a typical water heater control design, a dead band is defined around the set point temperature. When the measured water temperature falls below the lower band limit then the heater is turned on, and the heater is kept on until the measured water temperature reaches the upper band limit at which point the heater is turned off. More complex arrangements may be provided, such as including multiple heaters and/or multiple temperature sensors (placed high and low, for example). In general, however, by comparing the set point temperature with the current measured temperature the amount of (thermal) energy stored in the water heater can be quantitatively assessed. In the illustrative example, SOC=0% may be defined as the temperature being at the lower deadband limit and SOC=100% may be defined as the temperature being at the upper deadband limit. In this example, a SOC above 100% may be possible (to the extent that the temperature overshoots the upper limit), as well as a SOC below 0% (to the extent the temperature undershoots the lower limit). The microprocessor or microcontroller of the load controller also operates a power switch (e.g. a solenoidal or solid-state relay or the like) to switch load power on or off based on a control algorithm executed by the load controller.

In the system of FIG. 1, each load controller 11, 12, ..., 20 is programmed to switch load power to the controlled load 1, 2, ..., 10 on if the electrical frequency measured by the frequency meter 25 is higher than a threshold frequency stored in a memory of the load controller, and is programmed to switch load power off if the electrical frequency measured by the frequency meter 25 is below the stored threshold frequency. A system controller 30 transmits a load-specific threshold frequency to each load controller 11, 12, ..., 20 via a suitable electronic data network 32, and the transmitted threshold frequency is then stored in the load controller memory for use in switching the load on or off. The system controller 30 comprises a microprocessor, microcontroller, computer, or other electronic data processing device programmed to determine the threshold frequencies for the respective load controllers 11, 12, ..., 20. The electronic data network 32 may be a wired, wireless, or hybrid wired/wireless network, and by way of non-limiting illustration may be a power line communication (PLC) network, or a wireless WiFi network at the residence connecting the load controllers 11, 12, ..., 20 with the system controller 30 via the Internet, or so forth. The data network 32 is a bi-directional network, in that traffic flows both from the system controller 30 to the load controllers 11, 12, ..., 20; and from the load controllers 11, 12, ..., 20 to the system controller 30. In particular, the load-specific threshold frequency is transmitted from the system controller 30 to each respective load controller 11, 12, ..., 20 via the electronic data network 32; and load state information is transmitted from each respective load controller 11, 12, ..., 20 to the system controller 30 via the electronic data network 32. The transmitted load state information may be the SOC for the controlled load (in which case the microprocessor or microcontroller of the load controller is programmed to compute the SOC, e.g. from the set point temperature and current measured temperature in the case of an electric water heater load), or the load state information may be information sufficient for the system controller 30 to compute the SOC for the load at the system controller 30 (for example, the load state information may be the set point temperature and current water temperature in the tank). In addition to the SOC, the power rating (e.g. energy draw in kW when running) of each load should be known to the system controller 30, either by having this information conveyed from the load controller to the system controller 30 via the network 32, or by having the information pre-stored in the system controller 30.

It will be appreciated that the various hardware may take various forms, for example the load controllers may be integral with their respective controlled loads, or the load controllers may be separate units operatively connected with the respective controlled loads (or with salient components such as thermocouples, power relays, et cetera). The system controller 30 may be maintained by an ancillary service provider contracting with the electric power company to provide frequency regulation as a service, or may be directly owned and operated by the electric power company, or some other business arrangement may be employed.

With continuing reference to FIG. 1, the system controller 30 uses the SOC information for the loads 1, 2, . . . , 10 to determine a set of load-specific frequency thresholds for the respective loads 1, 2, . . . , 10 such that, as the electrical frequency increases, an increasing fraction of the total load fleet power consumption is engaged (that is, an increasing fraction of the total power that could be drawn by the fleet loads 1, 2, . . . , 10 is activated). In the illustrative embodiment, a load is either on or off—accordingly, a (reverse) droop control curve 40 implemented by this frequency-dependent load activation has a discrete power increase (a power "jump") at each load-specific threshold frequency due to that load being turned on as the frequency increases above that threshold frequency. (The term "reverse" droop control curve indicates that the load should increase with increasing frequency; whereas, for a generator droop control curve the output of the generator decreases with increasing frequency. Also, as used herein the term "droop control curve" is employed regardless of whether the plot places frequency on the ordinate and power on the abscissa as in FIG. 5, or vice versa as in the reverse droop control curve 40). Conversely, if the electrical frequency is decreasing, then a load will be turned off as the frequency decreases below the load-specific threshold frequency for that load. It will be appreciated that the granularity of these discrete jumps decreases as the size of the load fleet increases, and the curve is approximately continuous for a sufficiently large fleet. Additionally, if the loads provide continuously adjustable power this can be leveraged to smooth out the reverse droop curve.

The system controller 30 is programmed to choose the load-specific threshold frequencies for the respective loads 1, 2, . . . , 10 to achieve two goals: (1) provide the desired (inverse) droop control curve 40; and (2) ensure that each of the respective loads 1, 2, . . . , 10 is maintained within its desired operational range. Goal (1) implies that the load-specific threshold frequencies should form a distribution spanning the frequency range over which the inverse droop control curve is operative, so that at frequencies near the bottom of the operative frequency range only a few loads are turned on while at frequencies near the top of the operative frequency range most of the loads of the fleet are turned on. However, Goal (1) is constrained by Goal (2). In the limiting cases, Goal (2) implies that a load with SOC≤0% is "always on" (as it is fully discharged and must operate in order to build up charge, e.g. in order to heat the water in the water tank in the illustrative case of electric water heaters); whereas, a load with SOC≥100% is "always off" (as it is fully charged and any further charging would be detrimental, e.g. by heating the water to an uncomfortably hot or even dangerously scalding temperature, and/or producing an unsafe amount of heating on the tank thermal insulation, or so forth). The "always on" state can be achieved by setting the threshold frequency for the load to a very low value (e.g. 0 Hz), while the "always off" state can be achieved by setting the threshold frequency for the load to a very high value, i.e. a value that will never be achieved in any credible contemplated state of the power grid (e.g., 80 Hz may be high enough for a grid operating in North America with a design-basis 60 Hz frequency). More generally, Goal (2) favors running loads with low SOC values over loads with high SOC values.

Figure 3:
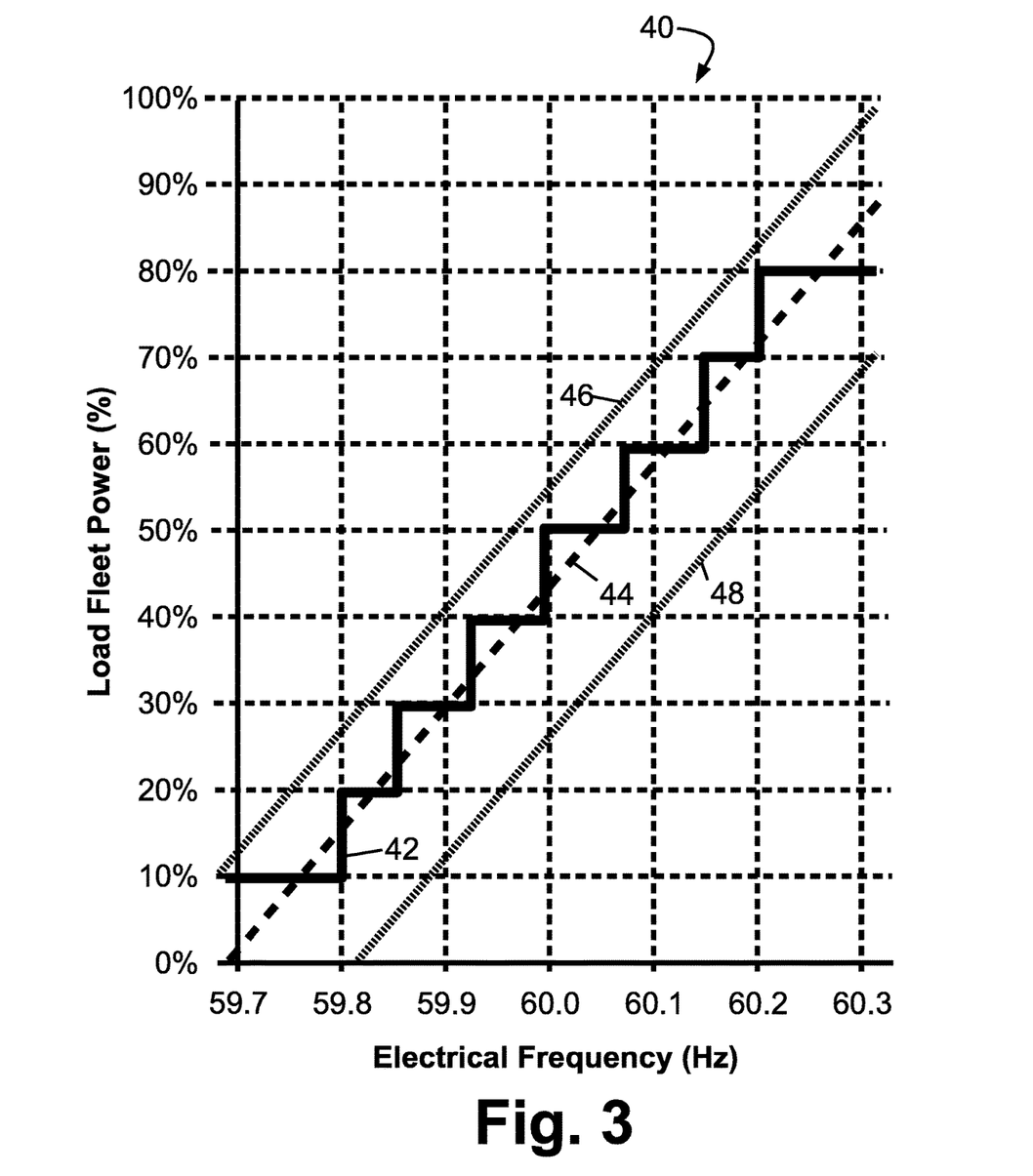
FIG. 3 diagrammatically shows a total fleet load-versus-electrical frequency curve (i.e. inverse droop control curve) provided by the threshold frequencies allocation of FIG. 2, assuming each load (water heater) has the same power draw.

With reference to FIG. 3, an approach for allocating the thresholds is described. In this example, the frequency response system is intended to be operative over a frequency range between 59.8 Hz and 60.2 Hz. That is, the fleet power draw should be at its minimum value (not necessarily zero, since loads with SOC≤0% must run) at or below 59.8 Hz; whereas, the fleet power draw should be at its maximum value at or above 60.2 Hz (where, however, any loads with SOC≥100% must be off). The top part of FIG. 3 shows the illustrative ten loads 1, 2, . . . , 10, each labeled with its respective SOC value. It will be noted that load 4 has SOC=−20%, that is, its water temperature is below the deadband minimum—it therefore must run. On the other hand, load 5 has SOC=110% and load 8 has SOC=120%—these loads must be off. The remaining loads 2, 3, 5, 6, 7, 8, 9 each have SOC>0% and SOC<100%, and hence can be selected to be either on or off. In the bottom plot, the loads are shown sorted by SOC value, with the lowest SOC loads furthest left and the highest SOC loads furthest right. Below each load in this bottom diagram, its threshold frequency is shown (except that for load 4 the threshold frequency is indicated as "ON" since it must be on, achievable by setting its threshold frequency to a very low value; and loads 5, 8 have threshold frequency "OFF" achievably by setting a very high threshold frequency). Loads with the lowest (positive) SOC are allocated the lowest frequencies in the operational range [59.8 Hz, 60.2 Hz], while loads with the highest SOC (while still below 100%) are allocated the highest frequencies.

Figure 2:
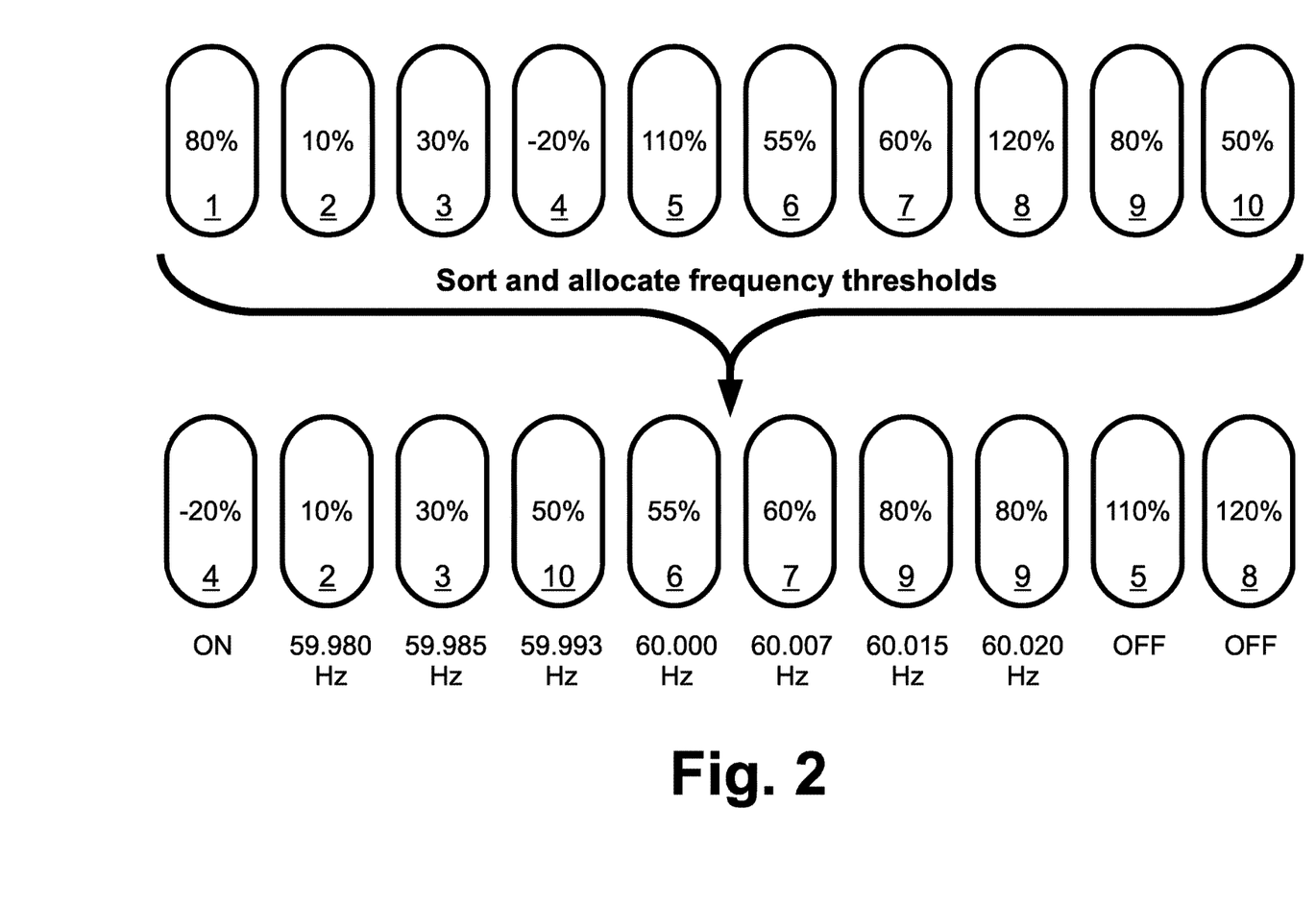
FIG. 2 diagrammatically shows an approach for allocating threshold frequencies of the loads of the frequency response system of FIG. 1 (where the loads are residential water heaters in this example).

With continuing reference to FIG. 2 and with further reference to FIG. 3, the inverse droop control curve 40 is shown in enlarged view. This illustrative inverse droop control curve 40 is obtained using the threshold frequency allocations indicated in the bottom diagram of FIG. 2, under the further assumption that the ten electric water heaters 1, 2, . . . , 10 each have the same power rating (i.e. each draw the same power when turned on). Under this latter assumption, each time the frequency increases so as to turn on an additional water heater, the total load fleet power draw increases by 10%. By appropriate distribution of the allocated threshold frequencies over the fleet of loads, the actually achieved inverse droop control curve 42 (plotted using a solid line) closely approximates (albeit in a discretized fashion) a target linear inverse droop control curve 44 (plotted using a dashed line).

Conventional frequency response operates locally on a per-load basis, using the locally measured frequency. On the other hand, the frequency response system of FIG. 1 includes the system controller 30 which can take a larger, e.g. regional, view. This provides additional frequency regulation capability. For example, if it is desired for the fleet of loads 1, 2, . . . , 10 to provide additional power draw (for example, to compensate for an unexpected loss of draw elsewhere, e.g. due to a power outage), the system controller 30 can implement an adjusted inverse droop control curve 46 (dotted line), which would cause the fleet to draw additional power at a given frequency. Implementing the adjusted inverse droop control curve 48, on the other hand, would cause the fleet of loads to draw reduced power at a given frequency. This type of frequency response which is controllable at a regional or other level is not achievable in the conventional local frequency response paradigm, which merely adjusts draw of individual devices locally based on a fixed target frequency (e.g. 60.000 Hz).

By way of further illustration, the allocation of threshold frequencies illustrated in FIGS. 2 and 3 may be implemented quantitatively, for example, by minimizing a suitable objective function. In the illustrative example of a binary (on/off) loads with fixed draw power in the on state, the fleet power draw is given by:

$$P_{fleet}(f) = \sum_{d \text{ having } SOC(d) \leq 0} P_d + \sum_{d \text{ having } f_d \leq f} P_d$$

where d denotes a device of the fleet, $P_d$ denotes the power draw of device d when on (e.g., in kW), f denotes the electrical frequency, $f_d$ is the frequency threshold for turning on the load d, the first summation accounts for power draw of any devices that are on because their SOC≤0, and the second summation accounts for power draw of those devices with positive SOC and threshold frequency $f_d$ below the current electrical frequency (so that they are turned on). In a slight variant, if the loads with SOC≤0 are assigned very low threshold frequencies (e.g. $f_d$=0) then the first summation is merged into the second summation. The target inverse droop control curve 44 of FIG. 3 (or a variant droop control curve 46 or 48) is suitably represented as a droop control curve function $P_{droop}(f)$. The frequency thresholds allocation is then formulated as a minimization problem:

$$\{f_d\} = \underset{f_d \in fleet}{\operatorname{argmin}} \int (P_{fleet}(f) - P_{droop}(f))^2 df$$

where $\{f_d\}$ is the set of frequency thresholds that minimizes the integral, and the integral is over the frequency range for which the droop control curve is intended to be operational. For specific designs, a more computationally efficient frequency thresholds allocation algorithm may be used. For example, considering the case of FIGS. 2 and 3, the threshold frequency for the load with the lowest positive SOC is between the frequency where $P_{droop}(f) = \Sigma_{d \text{ having } SOC(d) \leq 0} P_d$ and the frequency where $P_{droop}(f) = \Sigma_{d \text{ having } SOC(d) \leq 0} P_d + P_{step}$, where $P_{step}$ is the additional power that is drawn by turning on the load with the lowest positive SOC. This approach can be repeated for the power step provided by each next-lowest positive SOC load to construct the inverse droop control curve 42 of FIG. 3 in a step-by-step fashion based on the sorted loads of FIG. 2.

In a more complex variant, if the loads are not binary on/off loads but rather have adjustable power levels, then the terms $P_d$ for the individual loads can be replaced in the fleet power $P_{fleet}(f)$ by frequency-dependent terms functions as $P_d(f - f_d)$. These individual-load power functions may be parameterized, for example by power ramp slope values, and these parameters may also optionally be optimized along with the set of threshold frequencies $\{f_d\}$.

Figure 4:
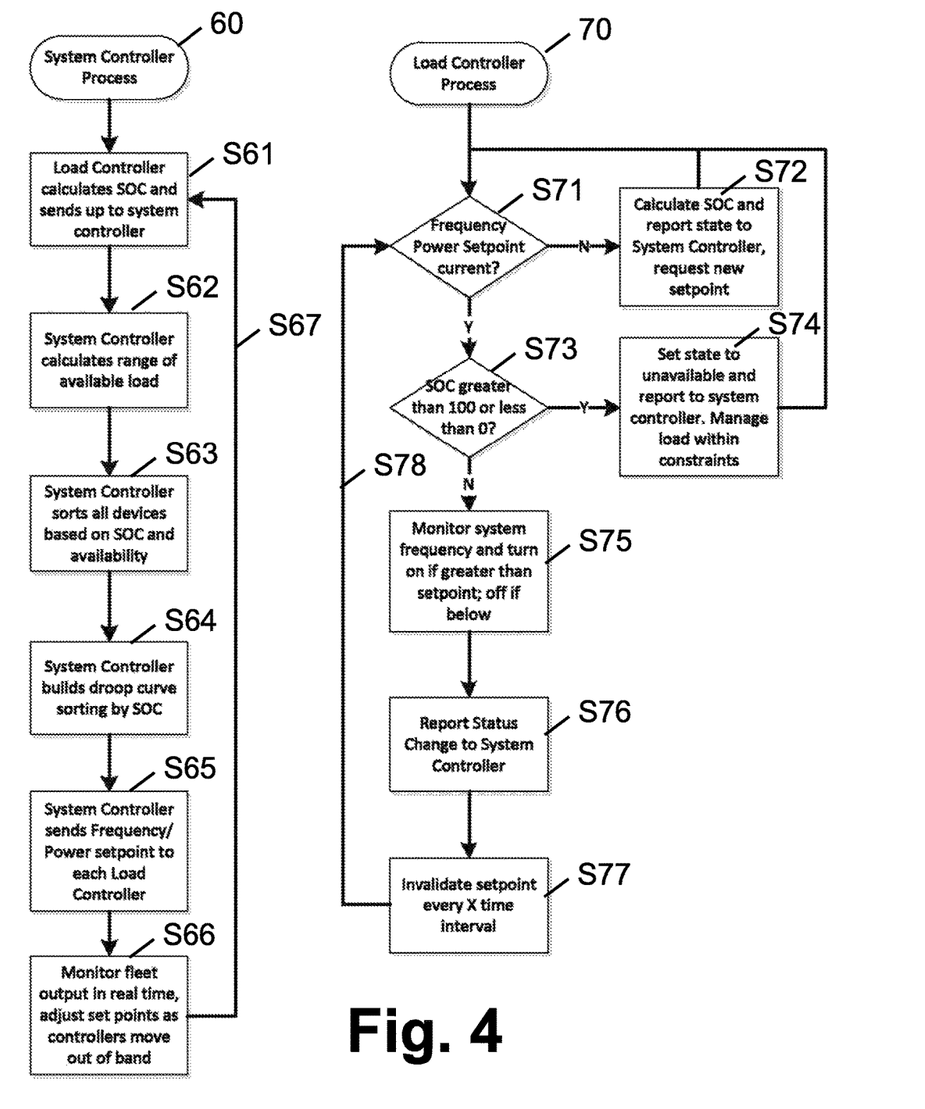
FIG. 4 diagrammatically shows an illustrative process suitably performed by the system controller of FIG. 1 (left flow diagram) and an illustrative process suitably performed by one of the load controllers of FIG. 1 (right flow diagram).

With reference now to FIG. 4, an illustrative system controller process 60 is shown that is suitably performed by the system controller 30 of FIG. 1 (left flow diagram), along with an illustrative load controller process 70 that is suitably performed by each of the load controllers 11, 12, . . . , 20 of FIG. 1 (right flow diagram). Considering first the system controller process 60, in an operation S61 the load controller 30 receives the State of Charge (SOC) computed for each load by its respective load controller. (Alternatively, this operation entails receiving sufficient data from the load controller in order for the system controller 30 to computed the SOC values at the system controller 30). In an operation S62, the system controller 30 calculates the range of available load. This In an operation S63 the system controller sorts loads by SOC value as already described with reference to FIG. 2. In an operation S64 the system controller 30 builds the inverse droop control curve 42 of FIG. 3 based on the loads sorted by SOC value, again as already described. Building the droop control curve 42 entails allocating the frequency thresholds $f_d$ for the loads. (For loads which are not binary on/off loads, the operation S64 may optionally also optimize individual load power parameters such as ramp slope). In an operation S65 the system controller 30 sends the frequency thresholds $f_d$ (along with any optimized individual load power parameters) to the respective load controllers 11, 12, . . . , 20. In an optional monitoring operation S66, the system controller 30 may monitor the loads, for example based on real-time power draw information provided to the system controller 30 from the load controllers. This monitoring may be used to generate an auditable record of the demand response provided by the system, or may be used to adjust load parameters in real time. The system controller process 60 is performed iteratively, so that in loop S67 flow returns to operation S61, for example so that an update loop is performed every few seconds.

With continuing reference to FIG. 4, the load controller process 70 is next described. In an update trigger S71, it is determined that the calculated SOC for the controlled load is due to be refreshed (or has changed enough to trigger a refresh) and flow passes to operation S72 which calculates the (updated) SOC and reports this value to the system controller 30 which receives the value in operation S61. In an operation S73 the SOC is checked as to whether it is below 0% (no stored charge or negative stored charge) or above 100% (excess stored charge), and if so in an operation S74 the state of the load is reported as unavailable to the system controller 30. (This is one approach for handling "out-of-range" SOC values; another approach as already described is to report the true SOC value to the system controller 30 so that the system controller 30 can handle the out-of-range SOC loads, e.g. by assigning threshold frequencies that keep the out-of-range SOC loads turned on or off as appropriate).

In an operation S75, the load controller reads the electrical frequency f in real time using the frequency meter 25, and controls the load by turning the load on if the electrical frequency f rises above $f_d$ and turning the load off if the electrical frequency f falls below $f_d$. In performing the load control operation S75, the load controller optionally may employ some protective algorithm to avoid cycling the load too quickly—for example, the load may be kept on after turn-on for at least some minimum time interval, and kept off after turn-off for at least some minimum time interval. In an operation S76, the load controller optionally keeps the system controller 30 updated on the status of the controlled load, thus providing the information received by the system controller 30 in the system controller process operation S66. In an operation S77, a refresh of the SOC calculation is triggered on a time basis, e.g. every X seconds. (Additional or other update trigger bases are contemplated, such as those already described with reference to blocks S71 and S72). On a refresh trigger, flow follows loop path S78 back to the operation S71. It will be appreciated that an instance of the load controller process 70 is executed concurrently on each load controller 11, 12, . . . , 20.

In general, the system controller 30 manages the fleet of load controllers 11, 12, . . . , 20 and communicates with a grid operator (not shown). Each load controller 11, 12, . . . , 20 manages its respective load 1, 2, . . . , 10 to monitor characteristics such as State of Charge (SOC), power consumption, or other operational factors. Depending upon the type of load, the SOC may be calculated as a range of temperatures (e.g., for the illustrative water heaters), as an actual charge in a battery (e.g., for loads comprising electric vehicles docked at a recharging station), or other measure of energy storage. As the electrical frequency f of the electrical power grid powering the loads 1, 2, . . . , 10 moves up and down, the frequency meter or meters 25 of the loads automatically detects the change in frequency and turns the controlled loads on and off based on their set point (e.g. the frequency thresholds $f_d$). Typically an energy storage load will "charge up" when turned on and "discharge" when used, so the status and SOC are periodically refreshed and the droop curve rebuilt. As the system runs, the SOC of each load will, in general, change over time, so the fleet of loads is periodically re-ordered and new set points (frequency thresholds) sent to each load.

The disclosed frequency response system employs the primary frequency control (i.e. frequency response) mechanism of controlling loads individually based on local electrical frequency, but does so in the context of a system controller that provides functionality analogous to secondary frequency control. For example, as described with reference to FIG. 3 the target droop control curve 44 can be adjusted to that of curve 46 or curve 48 in order to implement grid operator-directed control in a fashion similar to that achieved using a conventional AGC signal. (Indeed, the target droop control curve may be adjusted based on an actual received AGC signal).

However, the disclosed frequency control approach has substantial advantages as compared with a conventional AGC signal-mediated secondary frequency control. The droop control curve 42 adjustment (e.g. to curve 46, or to curve 48) can be performed at a lower time resolution compared with secondary frequency control, e.g. the droop control curve can be updated every minute or so (as compared with the AGC signal which is typically updated every two seconds or so in conventional secondary frequency regulation). This reduces communication speed and bandwidth required between the system controller 30 and the load controllers 11, 12, . . . , 20, and data updates are not as latency-dependent as in secondary frequency regulation. The disclosed approaches benefit from the very fast (on the order of seconds) response speed of the leveraged primary frequency control mechanism, as each load responds nearly instantaneously to changes in electrical frequency of the grid. As already mentioned, the grid operator could update the AGC signal or other control signal less frequently since the droop control curve can be updated more infrequently.

It will further be appreciated that the disclosed techniques may be embodied as a non-transitory storage medium storing instructions readable and executable by a computer or other electronic data processing device or devices that implement the system controller 30 and respective load controllers 11, 12, . . . , 20. The non-transitory storage medium may, for example, comprise a hard disk drive or other magnetic storage medium; a read-only-memory (ROM), erasable programmable read-only-memory (EPROM), flash memory, or other electronic storage medium; an optical disk or other optical storage medium; various combinations thereof; or so forth.

The preferred embodiments have been illustrated and described. Obviously, modifications and alterations will occur to others upon reading and understanding the preceding detailed description. It is intended that the invention be construed as including all such modifications and alterations insofar as they come within the scope of the appended claims or the equivalents thereof.

The invention claimed is:

1. A frequency control system providing frequency control for an a.c. electrical power grid operating at an electrical frequency using a fleet of electrical loads powered by the electrical power grid, the frequency control system comprising:

a system controller comprising an electronic data processing device programmed to assign load-specific threshold frequencies to electrical loads of the fleet of electrical loads, and to assign load-specific threshold frequencies to electrical loads of the fleet of electrical loads based on State of Charge (SOC) values for the electrical loads that measure energy stored in the electrical loads; and load controllers controlling the electrical loads of the fleet of electrical loads, wherein each load controller comprises a microprocessor or microcontroller programmed to perform load monitoring and control operations for a controlled electrical load of the fleet of electrical loads including (i) comparing a measurement of the electrical frequency with the threshold frequency assigned to the controlled electrical load and (ii) operating the controlled electrical load based on the comparison.

2. The frequency control system of claim 1 wherein each load controller performs the operation (ii) by:

turning the controlled electrical load on if the measurement of the electrical frequency is greater than the threshold frequency assigned to the controlled electrical load, and turning the controlled electrical load off if the measurement of the electrical frequency is less than the threshold frequency assigned to the controlled electrical load.

3. The frequency control system of claim 2 wherein the system controller is programmed to:

sort the electrical loads of the fleet of electrical loads by SOC value and assign higher load-specific threshold frequencies to electrical loads with higher SOC.

4. The frequency control system of claim 2 wherein the system controller is programmed to:

designate any electrical load whose SOC value indicates zero or negative energy is stored in the electrical load as must-run; and designate any electrical load whose SOC value is greater than a maximum SOC value as must-not-run;

wherein the load controller for any electrical load designated as must-run controls the electrical load by running the electrical load, and the load controller for any electrical load designated as must-not-run controls the electrical load by not running the electrical load.

5. The frequency control system of claim 4 wherein the system controller is programmed to:
designate any electrical load whose SOC value indicates zero or negative energy is stored in the electrical load as must-run by assigning a very low load-specific threshold frequency to the electrical load; and
designate any electrical load whose SOC value is greater than a maximum SOC value as must-not-run by assigning a very high load-specific threshold frequency to the electrical load.

6. The frequency control system of claim 2 wherein the fleet of electrical loads includes an electric water heater with a water tank, and the system controller or the load controller controlling the electric water heater is programmed to compute the SOC of the electric water heater based on a set point temperature of the electric water heater and a measured temperature of water in the water tank.

7. The frequency control system of claim 1 wherein the system controller is programmed to assign different load-specific threshold frequencies to different electrical loads of the fleet of electrical loads such that the load controllers controlling the electrical loads of the fleet of electrical loads generates a total power draw of the fleet of electrical loads that increases with increasing electrical frequency over an operational range of the frequency control system.

8. The frequency control system of claim 1 wherein the system controller is programmed to assign different load-specific threshold frequencies to different electrical loads of the fleet of electrical loads such that the load controllers controlling the electrical loads of the fleet of electrical loads generates a total power draw of the fleet of electrical loads in accordance with an inverse droop control curve over an operational range of the inverse droop control curve.

9. The frequency control system of claim 1 wherein each load controller includes a frequency meter configured to measure electrical frequency at the controlled electrical load and output the measurement of the electrical frequency used in the operation (i).

10. A frequency control method providing frequency control for an a.c. electrical power grid operating at an electrical frequency using a fleet of electrical loads powered by the electrical power grid, the frequency control method comprising:
estimating a State of Charge (SOC) value for each electrical load of the fleet which measures energy stored in the electrical load;
assigning load-specific threshold frequencies to electrical loads of the fleet based on the estimated SOC values; and
operating electric loads of the fleet whose load-specific threshold frequencies are below the electrical frequency of the grid while not operating electric loads of the fleet whose load-specific threshold frequencies are above the electrical frequency of the grid.

11. The frequency control method of claim 10 wherein the estimating comprises:
estimating the SOC value for an electrical load of the fleet comprising an electric water heater based on a set point temperature of the electric water heater and a measured water temperature of the electric water heater.

12. The frequency control method of claim 10 wherein the assigning comprises:
assigning load-specific threshold frequencies to the electrical loads such that the assigned load-specific threshold frequency increases with increasing SOC value.

13. The frequency control method of claim 10 wherein the assigning comprises:
assigning load-specific threshold frequencies to the electrical loads such that the operating causes the fleet of electrical loads to draw power from the electrical power grid in accordance with an inverse droop control curve.

14. The frequency control method of claim 10 wherein the operating further comprises:
operating any electric load of the fleet whose SOC value indicates a must-run state; and
not operating any electric load of the fleet whose SOC value indicates a must-not-run state.

15. A load controller for controlling an electrical load, the load controller comprising:
a frequency meter configured to measure electrical frequency at the controlled electrical load; and
a microprocessor or microcontroller programmed to perform load monitoring and control operations for the controlled electrical load including (i) comparing the electrical frequency at the controlled electrical load measured by the frequency meter with a threshold frequency assigned to the controlled electrical load and (ii) operating the controlled electrical load based on the comparison, wherein the load-specific threshold frequencies is assigned to the controlled electrical load of a fleet of electrical loads based on State of Charge (SOC) values for the electrical load that measure energy stored in the electrical load, and wherein the load controller performs the operation (ii) by:
turning the controlled electrical load on if the measurement of the electrical frequency is greater than the threshold frequency assigned to the controlled electrical load; and
turning the controlled electrical load off if the measurement of the electrical frequency is less than the threshold frequency assigned to the controlled electrical load.

16. A frequency control system providing frequency control for an a.c. electrical power grid operating at an electrical frequency using a fleet of electrical loads powered by the electrical power grid, the frequency control system comprising:
a system controller comprising an electronic data processing device programmed to assign load-specific threshold frequencies to electrical loads of the fleet of electrical loads based on State of Charge (SOC) values for the electrical loads that measure energy stored in the electrical loads, wherein the system controller is programmed to assign load-specific threshold frequencies to electrical loads of the fleet of electrical loads by operations including:
sorting the electrical loads of the fleet of electrical loads by SOC value; and
assigning higher load-specific threshold frequencies to electrical loads with higher SOC.

17. A frequency control system providing frequency control for an a.c. electrical power grid operating at an electrical frequency using a fleet of electrical loads powered by the electrical power grid, the frequency control system comprising:
a system controller comprising an electronic data processing device programmed to assign load-specific threshold frequencies to electrical loads of the fleet of electrical loads based on State of Charge (SOC) values for the electrical loads that measure energy stored in the electrical loads, wherein the system controller is programmed to assign different load-specific threshold frequencies to different electrical loads of the fleet of electrical loads such that the load controllers controlling the electrical loads of the fleet of electrical loads generates a total power draw of the fleet of electrical loads that increases with increasing electrical frequency over an operational range of the frequency control system.

* * * * *